Aug. 13, 1963

T. H. HINCHCLIFFE 3,100,566

CONVEYOR BELT CLEATS

Filed Sept. 27, 1960

INVENTOR.
THEODORE H. HINCHCLIFFE
BY W. Glenn Jones
ATTORNEY

Aug. 13, 1963
T. H. HINCHCLIFFE
3,100,566
CONVEYOR BELT CLEATS
Filed Sept. 27, 1960
2 Sheets-Sheet 2
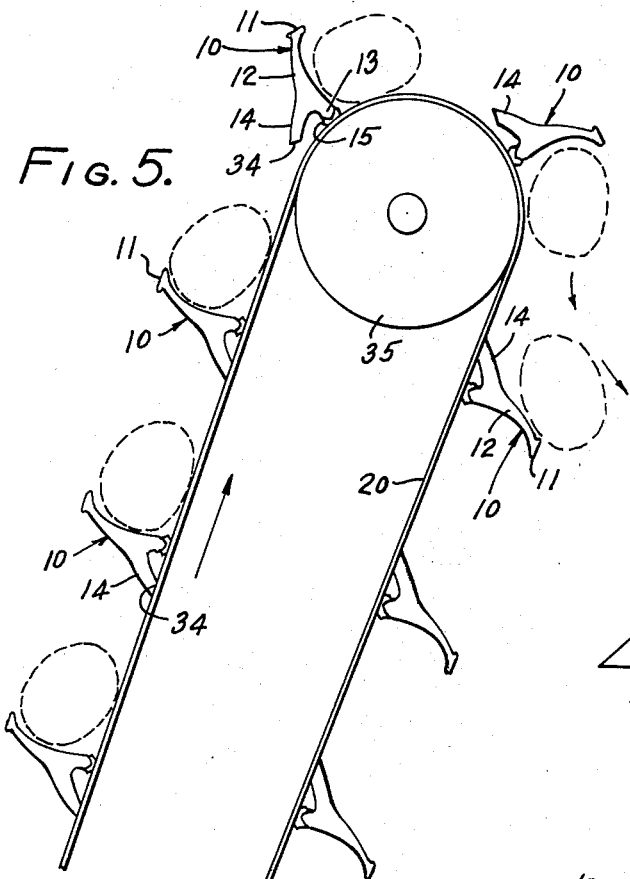
FIG. 5.
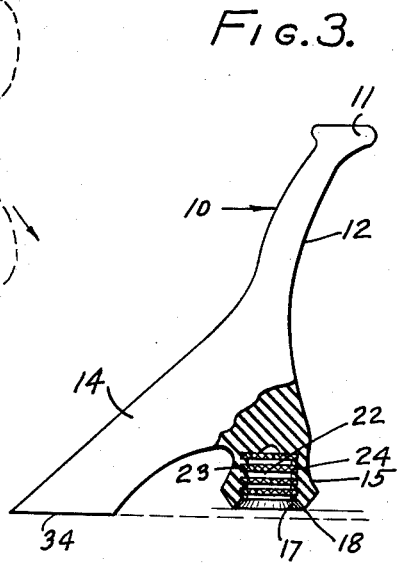
FIG. 3.
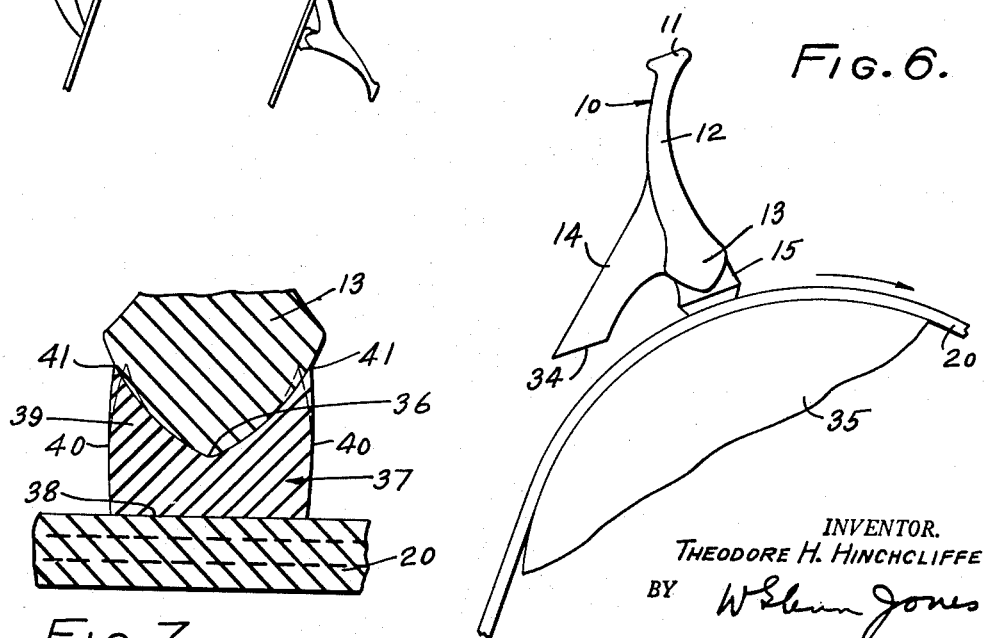
FIG. 6.
FIG. 7.
INVENTOR.
THEODORE H. HINCHCLIFFE
BY W. Glenn Jones
ATTORNEY

United States Patent Office 3,100,566
Patented Aug. 13, 1963

3,100,566
CONVEYOR BELT CLEATS
Theodore H. Hinchcliffe, Pasadena, Calif.; Emily Hinchcliffe, administratrix of said Theodore H. Hinchcliffe, deceased
Filed Sept. 27, 1960, Ser. No. 58,684
3 Claims. (Cl. 198—199)

This invention relates to improvements in elevator or belt conveyors and particularly to improvements in the generally transversely disposed cleats usually carried by such conveyor belts.

In the common practice of assembling conveyor belts as used in the agricultural, milling, mining, and various other manufacturing processes, it is customary to provide variously shaped cleats fastened directly to the belts by means of simple bolts, screws or other similar fastenings. These cleats are generally made of metal, wood, or such other inflexible materials and, therefore, cannot bend or yield when passing around or over the rollers and crowned drive pulleys on which the belt is suspended. This inflexibility results in a wearing and enlargement of the bolt holes in the belt which results in its progressive weakening and, usually, the loss of a good share of the cleats. Such cleats are usually flat-bottomed, i.e., the base adjacent to the belt is co-planar therewith. As wear occurs in the bolt holes in the belt, or as the bolts or screws become loosened by vibration, the cleats tilt away from the direction of travel of the belt and particles or parts of the material being conveyed lodge under the flat base of the cleats. This action accelerates the separation of the cleats from the belt and rupture of the belt.

Some conveyor belts are being supplied with flexible cleats. Such cleats are constructed as part of the belt itself; the bases thereof being intermixed with the plies or covers of the belt and further cemented or vulcanized into place. Such cleated belts are very bulky and are difficult to ship or transport from place to place. These types of cleats are fixed in pitch, i.e., distance from one cleat to the next, and in linear dimension, usually the width of the belt. Any attempt to change the linear dimensions of such cleats usually results in injuring the cleats and the surface of the belt leading to its early destruction.

Such cleats as described above are generally low in height. Any increase in height is usually accompanied by a broader base which, in turn, accentuates the difficulties and disadvantages enumerated above. The provision of detachable high or elevator cleats to handle large objects, such as cabbages, pineapples, or other large objects has been attended with considerable difficulty.

The principal object of my invention, therefore, is to provide separate flexible cleats which may easily be attached to a conveyor or elevator belt in the field and which may be removed with equal facility without damaging cleats or belts, as the need arises.

Another object of my invention is to provide a flexible and detachable elevator cleat which is comparatively high relative to its base thickness or width and yet will not cause undue wear or strain on the belt to which it is detachably secured.

A further object of my invention is to provide an elevator cleat that is substantially supported during its load cycle and yet cannot prevent the belt from properly flexing as it rides over the supporting pulleys.

Other objects and advantages will reveal themselves in the following description and accompanying drawings wherein:

FIG. 3 is a side elevation partly in cross-section of my improved elevator cleat;

FIG. 5 is a schematic elevation showing one manner of use of my improved elevator cleat;

FIG. 6 is an enlargement of one cleat shown in FIG. 5 as it passes over one of the belt pulleys; and FIG. 7 is a side elevation taken on the line 7—7 of FIG. 2 of a portion of the cleat and the modification.

Figure 1:
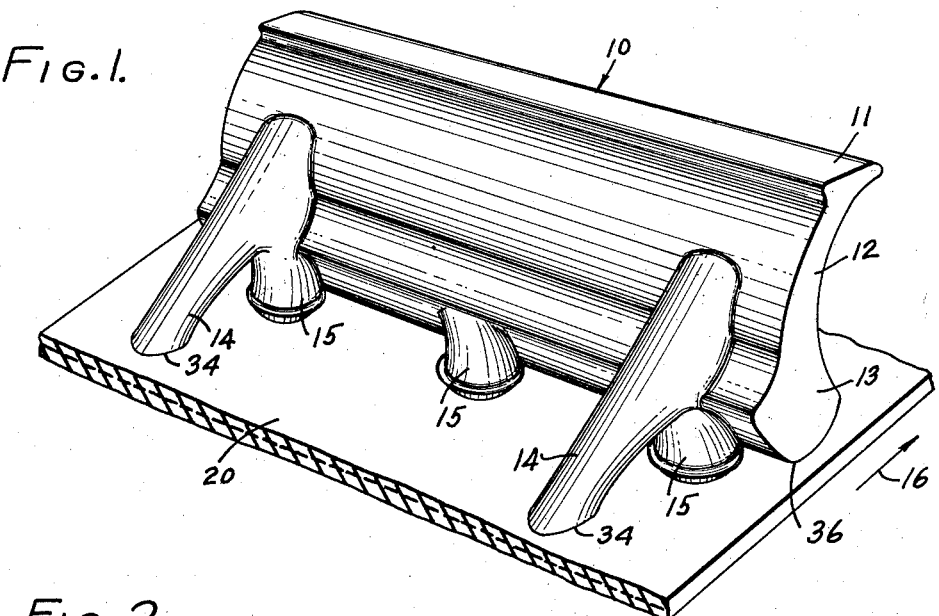
FIGURE 1 is a perspective rear view of my improved elevator cleat attached to a section of conveyor or elevator belting.

With reference to FIG. 1, my improved detachable elevator cleat 10 is shown located transversely on belt 20. Cleat 10 may be formed of rubber, rubber substitutes, leather, hard-pressed felt, certain plastics, or other similar resilient materials. The elevator or conveyor belt 20 may be made of any of the materials commonly used for such belts as treated canvas, leather, rubber, synthetic rubber, other textiles, or various combinations thereof.

Cleat 10 comprises a horizontal rib or lip portion 11, a central rib portion 12, a generally ogival shaped base portion 13, downwardly extending lateral supports 14 and cylindrical base abutments or belt gripping portion 15.

The central rib portion 12 is formed with its forward face generally concavely in the normal direction of travel as shown by the arrow 16. The rear face of the rib portion is convex and generally parallel to the front face except that it may diverge slightly outward so as to thicken up the base portion. The generally T-shaped lip portion 11 not only provides horizontal stability at the upper portion of the cleat but serves to provide a definite lip in the forward direction which helps to retain objects on the cleat, particularly when the elevator angle used may be somewhat steep.

The enlarged, inverted ogival shaped base portion 13 is enlarged to provide horizontal stability in the lower portions of the cleat as well as to provide a substantial seat for the cylindrical abutments or belt gripping portions 15. The rear supports 14 extend outwardly and downwardly from the rear face of the cleat and provide vertical stability thereto when the cleat is under load. The term vertical stability is to be interpreted as meaning the ability to maintain the cleat substantially at right angles to the surface of the belt to which it is removably attached. These supports usually extend downwardly at an angle of 45° with the central rib portion. The angles are not particularly critical and may vary widely depending on the height of the cleat, its load bearing capacity, and its spacing from the next adjacent cleat on the belt.

Figure 4:
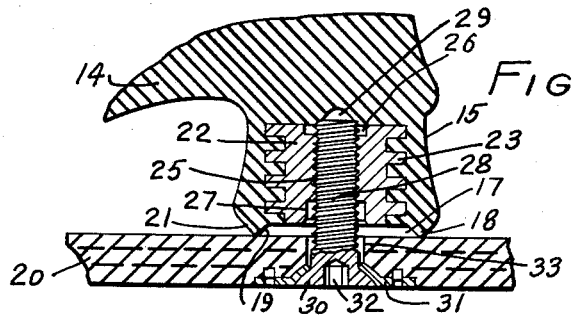
FIG. 4 is a detail taken on the line 4—4 of FIG. 2 showing a mode of attachment of my improved elevator cleat to a belt.

As shown in FIGS. 3 and 4, cylindrical abutments 15 not only furnish lateral stability and reinforcement to the base portion of the cleat, but have further important functions related to the fastening of the cleat to the belt. These abutments are provided with a shallow truncated cavity 17 having a protruding circular rim or belt gripping projection 18. It will be noted that the diameter of the rim 18 is less than that of the abutment 15; also that the internal angle 19 of the rim with the surface of the belt is less (more acute) than the corresponding external angle 21. As the compression of the cleat on the belt is increased, this rim 29 depresses the surface of the belt to a slight extent and, due to the angular relationships, the rim is forced outwardly, thus creating a watertight pressure seal between the cleat abutment and the belt. This seal, in turn, prevents any material getting under the cleat at its point of attachment to the belt, thus obviating any rocking or working of the cleat which would result in undue wear of the belt and deterioration in the screw holes in the belt.

As shown in FIGS. 3 and 4, a finned insert 22 is molded into each cylindrical abutment 15. This insert is substantially coaxial with the abutment and may be of metal, plastic, or other suitable material. The films 23 may be provided with an external knurled surface 24. The fins and knurled portions furnish efficient keys for locking the insert into the molded or formed cleat material. Such construction is necessary in order to resist the compressive and twisting forces set up by the cleat-to-belt fastening means as well as to reinforce the cleat against the lateral strains set up by the load.

These inserts 22 are provided with a threaded bore 25 and concentric counterbores 26 and 27 at the upper and lower ends of the threaded bore 25. As shown in FIG. 4, upper shallow counterbore 26 allows the molded material to flow adjacent to the upper end of threaded bore 25 so that the material will engage the upper threads of the compression screw 28 as they protrude through the insert into the molded cavity 29. If, due to vibrations or other causes, the screw 28 tends to unscrew, it would commence to descend. The molded material filling the upper threads of the screw would tend to flow downwardly between the screw threads of the screw and the threaded bore would also compress against the walls of the counterbore. This flow of molded material between the screw threads and compression in the upper counterbore would tend to lock the screw and prevent its further rotation and descent.

As shown in FIG. 4, screw 28 is provided with a comparatively large flat head 30 and locking washer 31 which take up and are compressed into the under surface of the belt 20. The screw head 30 is provided with the usual hexagonal or otherwise formed socket 32 for insertion of the usual wrench. Screw 28 extends upwardly through the belt through the hole 33 which may be punched, drilled, or otherwise formed in the belt. The lower counterbore 27 is formed somewhat deeper than the upper counterbore 26. This construction is provided for the easy insertion of the screw 28 through the belt hole 33 into the threaded insert 22.

It is understood, of course, that the cleat with its supports and abutments are usually molded or formed in one piece, i.e., the supports and abutments are integral portions of the cleat. While not shown, it may be appreciated that various forms of reinforcement could be molded into the cleat for special load resisting purposes. Thus, a metal rod could be molded into the lip portion for enhanced horizontal stability and rigidity. A heavy screen or plate of plastic or metal could be molded into the main body or central rib portion 12 and supports 14 could be supplied with reinforcing cores which could be secured at their upper ends to the aforementioned screen or plate.

It will be noted, in FIG. 3, that the plane of the foot 34 is made somewhat lower than the plane of the rim 18 of the abutment 15. This is done to enhance the load resisting characteristics of the cleat. When the cleat is fastened to the belt, the lengthened support 14 forces the cleat forward so that the angle between the face of the cleat and the belt is slightly less than 90°. As load is placed on the cleat, this angle will increase to approximately 90° due to the compression in the support members 14 and the flexing of the cleat. Thus the load retention feature of the cleat is maintained while providing maximum load resisting characteristics. The foot 34 of the support member 14 is not fastened to the belt; it rests upon the surface of the belt during the load handling operation and then is free to leave the surface, as shown in FIG. 6, when the cleat passes over the pulley 35. Thus, as indicated in FIG. 5, when the cleat is load-bearing, it is afforded maximum stability by the supports resting on the surface of the belt. Then as the belt goes over the pulley, the support member is free to leave the belt surface somewhat and no constraint is placed on that portion of the belt between the fastening abutment 15 and the feet of the supports. If the feet of the supports were also secured to the belt, the constraint placed on that portion of the belt between the abutments and the feet of the supports would result in rapid wear of the belt as it passed over the pulley. Thus, the normal flexing of the belt is not prevented.

The normal use of my improved elevator cleat is shown in FIG. 5. Here, large objects such as pineapples and cabbages are being conveyed upwardly and discharged downwardly into a waiting chute or other receptacle (not shown).

Figure 2:
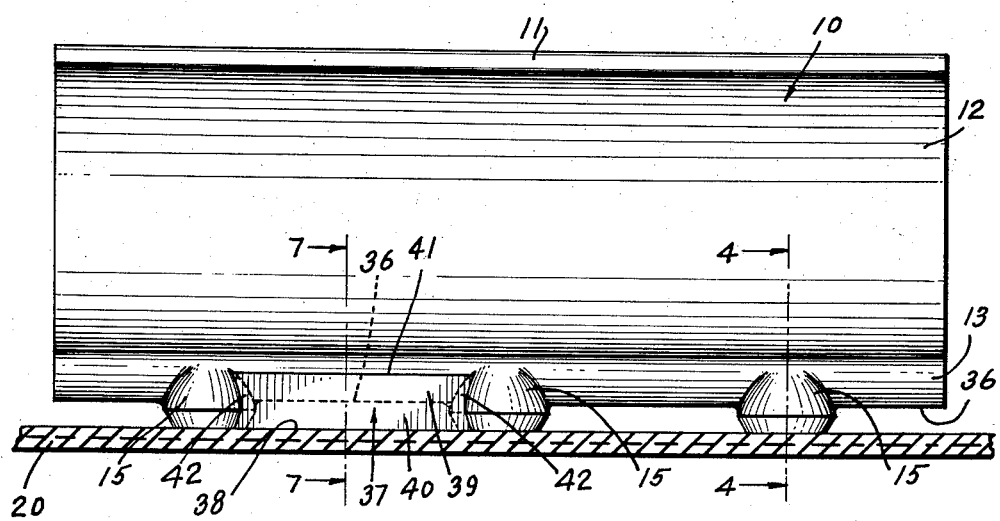
FIG. 2 is a front elevation of my improved elevator cleat attached to a belt showing a modification.

While, as shown, the normal use of my improved elevator cleat is for conveying or transporting large articles and the lower edge 36 is located some distance above the surface of the belt as best shown in FIG. 2, it may be desirable to transport grain, chemical crystals, coal or other materials of a size which would allow them to escape through the normal space between the bottom of the cleat and the surface of the belt. To adapt my improved elevator cleat to such uses, molded resilient inserts 37 (one shown in FIG. 2) may be provided for filling in this, now unwanted, space. As shown in FIG. 7, these molded inserts 37 are provided with a flat belt-engaging base 38 and an upper portion 39 molded to fit the ogival contour of the cleat base portion 13. As shown, the sides 40 of the inserts may be straight and substantially at right angles to the base 38. The thickness or width between the sides 40 should preferably be less than the maximum thickness or width of the cleat base portion 13. This is so the upper edges or rims 41 will grip the sides of the base portion 13 below the widest part and thus prevent material from lodging between the base portion of the cleat and the upper surface of the insert. As may be noted, in phantom, the upper edges 41 may be molded with a slight cant inwards so as to better grip the cleat base portion 13.

The ends 42 of the insert 37 are molded somewhat concave to adjust themselves to the contour of the abutments 15. Thus, when the inserts 37 are used, they may be snapped into place along the lower edge of the cleat between the abutments and the concaved ends 42 serve to hold them in place in conjuction with the slight gripping action of the edges or rims 41. With the molded resilient inserts 37 thus installed, the cleat may be fastened to the belt in the usual manner. The height of the insert may be made slightly greater than the normal distance between the lower edge 36 of the cleat base portion 13 and the surface of the belt so that when the cleat is fastened down onto the belt, the resilient inserts 37 will be slightly compressed thereby providing a better sealing action between the cleat and the belt as well as serving to better retain the inserts properly in place.

If it is found necessary to place the inserts 37 for the full width of the cleat, it may be necessary to cut the insert in half or some other fraction thereof for insertion between the outboard abutment and the end of the cleat. In this instance, it would be best to apply adhesive to the base and upper surface of the insert in order to retain it in place. In normal circumstances, however, the use of end inserts is not necessary.

While I have thus described a preferred embodiment of my invention illustrating three abutments and two supports, it should be understood that, considering the width of the belt and cleat, any number of abutments and any number of supports could be used. As an idea of the sizes of such cleats, the one illustrated could be approximately 12 inches wide with an abutment center-to-center distance of 5 inches and have an approximate height of 6 inches. The supports would project outwardly a maximum distance of say 3 inches, with a center-to-center distance of 10 inches; i.e., generally the axes of the supports and their corresponding abutment intersect, though not necessarily so, as the supports could be molded behind the outboard edges of the cleat.

Having thus described my invention, I claim:

1. A detachable elevator cleat of resilient material for conveyor belts comprising, in combination:

a horizontal base portion adapted for installation adjacent the surface of said belt, said base portion having a lower part in the form of an inverted ogive with its apex adjacent to but separated from the surface of the conveyor belt to which the cleat is detachably secured;

an upwardly extending curved rib portion formed integrally with said base portion, said curved rib portion having a concavely curved front face in the direction of motion of said belt, and a convexly curved rear face, substantially parallel to said front face;

a T-shaped horizontal rib extending parallel to said base portion across the top of said upwardly extending rib portion, said horizontal rib portion being formed integrally with said upwardly extending curved rib whereby said curved rib is strengthened in the horizontal plane and the forward portion of the T-shaped rib extending in the direction of motion of said conveyor belt beyond the concave face of said curved rib functions as a lip to prevent articles being conveyed from falling off said cleat;

support means depending angularly downwardly from said rear face to the surface of said belt in the rear of said cleat for maintaining said cleat substantially perpendicular to the surface of said belt under load conditions, said support means comprising a plurality of cleat material projections integrally formed with said curved rib portion, at least two of said projections being disposed near the ends of said cleat;

vertical abutment means formed in said base portion, said abutment means extending downwardly from said base portion;

a belt surface gripping base on the bottom of each of said abutment means adapted to grip the upper surface of said belt and form a seal therewith; and means associated with said abutment means and said belt for removably securing said cleat to the upper surface of said belt.

2. A detachable elevator cleat for conveyor belt as claimed in claim 1 further characterized by said support means having bases substantially co-planar with the bases of said abutments and the surface of said belt, said support means bases being free to slide on the surface of said belt and to be separated therefrom when said belt passes over a belt supporting pulley.

3. A detachable elevator cleat as claimed in claim 1 further characterized by having insert means formed from resilient material forcibly inserted along the apex of said ogive and between each pair of said abutment means for closing in the space between said base portion and the surface of said belt when said cleat is detachably secured to said belt, said insert means comprising blocks of resilient cleat material with an upper portion formed to grippingly receive said base portion ogive, a lower flat base portion to rest substantially on the surface of said belt and concaved ends formed to grippingly receive the formed sides of said adjacent abutment means.

References Cited in the file of this patent

UNITED STATES PATENTS

| | | |
|---|---|---|
| 699,638 | Allison | May 13, 1902 |
| 1,203,827 | Westlin | Nov. 7, 1916 |
| 2,296,810 | Dahlman | Sept. 22, 1942 |
| 2,545,377 | Parisi | Mar. 13, 1951 |
| 2,809,742 | Holz | Oct. 15, 1957 |
| 2,875,887 | Hinchcliffe | Mar. 3, 1959 |
| 2,987,169 | Hinchcliffe | June 6, 1961 |

FOREIGN PATENTS

| | | |
|---|---|---|
| 1,033,499 | France | Apr. 1, 1953 |